United States Patent
Farrokhi et al.

(10) Patent No.: US 7,994,981 B1
(45) Date of Patent: Aug. 9, 2011

(54) SYSTEM FRAMEWORK FOR MOBILE DEVICE LOCATION

(75) Inventors: Farrokh Farrokhi, San Ramon, CA (US); Edmund Gregory Lee, Palo Alto, CA (US); Dickson T. Wong, Burlingame, CA (US); Arthur J. Collmeyer, Incline Village, NV (US)

(73) Assignee: etherWhere Corporation, Palo Alto, CA (US)

( * ) Notice: Subject to any disclaimer, the term of this patent is extended or adjusted under 35 U.S.C. 154(b) by 0 days.

(21) Appl. No.: 12/807,463

(22) Filed: Sep. 7, 2010

(51) Int. Cl.
*G01S 1/08* (2006.01)
(52) U.S. Cl. ...................................... 342/386
(58) Field of Classification Search .................. 342/386
See application file for complete search history.

(56) References Cited

U.S. PATENT DOCUMENTS

| | | | | |
|---|---|---|---|---|
| 4,864,308 | A * | 9/1989 | Raab et al. | 342/351 |
| 5,440,491 | A * | 8/1995 | Kawano et al. | 701/200 |
| 5,583,513 | A * | 12/1996 | Cohen | 342/357.42 |
| 6,054,950 | A * | 4/2000 | Fontana | 342/463 |
| 6,133,873 | A * | 10/2000 | Krasner | 342/357.59 |
| 6,160,837 | A * | 12/2000 | Bruno et al. | 375/130 |
| 6,195,556 | B1 * | 2/2001 | Reudink et al. | 455/456.2 |
| 6,236,359 | B1 * | 5/2001 | Watters et al. | 342/357.29 |
| 6,707,424 | B1 * | 3/2004 | Snyder et al. | 342/357.29 |
| 6,782,265 | B2 * | 8/2004 | Perez-Breva et al. | 455/456.1 |
| 7,026,992 | B1 * | 4/2006 | Hunt et al. | 342/465 |
| 7,406,116 | B2 * | 7/2008 | Agrawala et al. | 375/213 |
| 7,411,548 | B2 * | 8/2008 | Lommen | 342/386 |
| 2002/0149515 | A1 * | 10/2002 | Alanen et al. | 342/357.1 |
| 2008/0284647 | A1 * | 11/2008 | Oren et al. | 342/357.09 |

OTHER PUBLICATIONS

Brain, Marshall, and Tom Harris. "How GPS Receivers Work" Sep. 25, 2006. HowStuffWorks.com. <http://www.howstuffworks.com/gadgets/travel/gps.htm>.*

* cited by examiner

*Primary Examiner* — Thomas Tarcza
*Assistant Examiner* — Frank McGue

(57) ABSTRACT

A method for estimating the location of a beacon from an ensemble of measurements associated with said beacon, where, contained in each measurement, are GPS data from which surfaces of location may be extracted, together with the ID's of beacons detectable at the point of measurement, is disclosed. The method comprises extracting the canonical set of surfaces of location implicit in each of the associated measurements, and determining the estimate of the location of the beacon as the point for which the sum of the squares of the distances to each of the surfaces so extracted is minimized. A system for the compilation of a database of beacon locations from measurements containing a time-stamped recording of the composite GPS signal (which recording is referred to as a datagram), together with the ID's and associated signal strengths of beacons detectable at the point of measurement, is also disclosed. The system comprises GPS signal processing means for extracting, from each time-stamped datagram, the canonic set of surfaces of location, and beacon location estimation means for estimating the location of a beacon from an ensemble of surfaces of location associated with said beacon.

11 Claims, 14 Drawing Sheets

Figure 7a            160

SYSTEM FRAMEWORK FOR MOBILE DEVICE LOCATION

CROSS-REFERENCE TO RELATED APPLICATIONS

This application claims priority under 35 U.S.C. §120 from pending U.S. patent application Ser. No. 12/587,096 and Ser. No. 12/587,099, entitled "Signal Processing Techniques for Improving the Receive Sensitivity of GPS Receivers" filed on Oct. 2, 2009, the subject matter of which is incorporated herein in its entirety. This application further claims priority under 35 U.S.C. §120 from pending U.S. patent application Ser. No. 12/387,888 and Ser. No. 12/387,889, entitled "Signal Processing Techniques for Improving the Receive Sensitivity of GPS Receivers" filed on May 9, 2009, the subject matter of which is incorporated herein in its entirety. This application further claims priority from pending U.S. patent application Ser. No. 12/220,612, entitled "Method and Apparatus for Determining Location" filed on Jul. 25, 2008, the subject matter of which is incorporated herein in its entirety.

STATEMENT REGARDING FEDERALLY SPONSORED RESEARCH OR DEVELOPMENT

Not Applicable

BACKGROUND OF THE INVENTION

This invention relates to techniques for determining location and, specifically, to techniques that utilize the NAVSTAR Global Positioning System (GPS).

The NAVSTAR Global Positioning System (GPS) developed by the United States Department of Defense uses a constellation of between 24 and 32 Medium Earth Orbit satellites that transmit precise microwave signals, which allows devices embodying GPS sensors to determine their current location. Initial applications were predominantly military; the first widespread consumer application was navigational assistance.

With the explosive growth in mobile communications devices, a new wave of location-based applications is emerging. These applications are characterized by a requirement for device-centered maps. One example is a form of "Yellow Pages" in which a map centered at the location of the mobile device presents user-selected establishments (e.g., barber shops) in situ. Another example would be an application enabling one to locate, on a device-centered map, members of his or her social network. In these applications, location involves but two dimensions (North/South and East/West). The ability of GPS to provide three dimensional locations (or "fixes") is, for the most part, irrelevant. Accordingly, the narrative which follows ignores the three dimensional possibilities. Outdoors, GPS (using four or more satellites) is a reliable and accurate source of the location information essential to enable a device-centered map to be served across a network to a mobile device. However, today's GPS receivers operating in 3D mode (using four satellites) do not have the receive sensitivity required to generate fixes indoors. In 2D mode (using just three satellites and, most commonly, a pseudo satellite located at the center of the earth), the sensitivity improves slightly, but not enough. As a result, location-based applications utilize GPS outdoors, and any of several proprietary location service providers indoors.

Location services are built around proprietary databases, compiled by location service providers. These databases are essentially compilations of the locations of terrestrial transmitting towers (beacons), or compilations of the signal-strength contours surrounding these beacons, or compilations of the locations together with the associated signal-strength contours. A subscriber (to the location service) provides the ID's and (optionally) the associated signal strengths of any beacons detectable by his or her mobile device, and the location service provider responds with its best estimate of the location of the device.

FIG. 1 describes a typical Mobile Device Location System (MDLS) employed by a location service provider to compile its Beacon Location/Signal-Strength Contour Database (BLDB)—the database of beacon locations and associated signal-strength contours utilized in the servicing of subscriber requests. Key elements of this system (in addition to the aforementioned BLDB) are the Beacon Survey Database (BSDB), the Beacon Location/Signal-Strength Contour Engine (BLEN) and the Mobile Device Location Engine (MLEN). The Beacon Survey Database is comprised of measurements taken at various times and places for use by the BLEN in the compilation of the BLDB which, in turn, is used by MLEN to estimate the location of a subscriber's mobile device. As survey measurements are often taken within range of multiple beacons, it is necessary to demultiplex the measurement data for storage in BSDB, which is structured around beacons.

Whether the beacons are cellular towers or Wi-Fi access points—the measurement processes are largely identical. Measurements are taken using instruments similar to (and in some cases, identical to) the mobile communications devices the MDLS has been designed to locate. The standard mode of operation is to traverse the geography of interest with a measuring instrument, pausing periodically to record its location (using GPS) together with the ID's and signal-strengths of any beacons detectable by the device. As these measurements accumulate, beacon locations and associated signal-strength contours are generated and thereafter continually updated by the BLEN, to enable the generation of accurate and reliable estimates of location in response to subscriber requests. On the receipt of a request from a subscriber, the MLEN applies the information provided (by the subscriber) to generate its estimate of the subscriber's location. Methods for generating such estimates are well known in the art. One very simple approach would be to match the beacon presenting the strongest signal (as reported by the subscriber) with a beacon in the BLDB. Absent any signal-strength input, an approach might be to select from the beacons reported by the subscriber, the most frequently sensed, using a "sense count", maintained by the MLEN and stored with each beacon in the BLDB.

The franchise of a location service provider may be valued in terms of its ability to reliably and accurately locate mobile devices. Because the techniques for estimating location and developing contours are understood and commonly practiced, the ability to reliably locate mobile devices hinges on the accuracy and comprehensiveness of the Beacon Survey Database. If the BSDB contains inaccurate measurements, those inaccuracies will result in inaccurate beacon locations or signal-strength contours in the BLDB, which will contribute to inaccuracy in the estimated location of a subscriber's mobile device. Moreover, if the BSDB is sparse, gaps in beacon and contour coverage are possible, rendering the service unreliable to its subscribers. To deliver reliable service thus requires complete and comprehensive coverage of the service domain.

The most common types of beacons in use today are cellular towers and Wi-Fi access points. While the former provide broader coverage in the aggregate, locating them with sufficient precision to enable accurate triangulation to a subscriber location requires a large number of measurements. Resigned to the requirement for a massive Beacon Survey Database, cell-tower-based service providers have, in some cases, opted to construct signal-strength contours as well, to mitigate the estimation error. Given the limited range of a Wi-Fi access point, access-point-based service providers take a different approach. With the acquisition of a handful of measurements for a given beacon, they may be able to estimate its location with sufficient accuracy to begin service immediately to subscribers within range of that beacon. However, there are many more Wi-Fi access points than cellular towers—and, to make matters worse, most are indoors, where the likelihood of three acquirable GPS satellites (required for a 2D GPS fix) is low.

While on the surface it might appear that cell-tower-based systems have the edge over access-point-based systems, some would argue that cell-tower-based systems are out of step with the growth in applications built on the assumption of broadband access, which in turn is fueling the rapid growth in Wi-Fi-only as well as dual-mode (cellular plus Wi-Fi) communications devices. As mobile broadband traffic searches for relief from the cost and congestion of the cellular networks, location-based applications will increasingly favor access-point-based location services. That is not to suggest that access point services will make cell tower services irrelevant; both will be needed.

Considering the limitations of current techniques for compiling large Beacon Survey Databases—there is clearly a need in the art for an MDLS framework to enable rapid, inexpensive compilation of comprehensive Beacon Survey Databases, with the accuracy required by current and contemplated location-based applications.

BRIEF SUMMARY OF THE INVENTION

In general, the object of the present invention is to provide an MDLS framework to enable the rapid and inexpensive compilation and maintenance of a comprehensive Beacon Survey Database, with the accuracy required by current and contemplated location-based applications. As the repository for field measurements, applied ultimately to estimate the locations of subscribers' mobile devices, the Beacon Survey Database influences virtually every metric of importance to the operators as well as the subscribers of location services. Measurements must be easily and efficiently obtained, using accurate but inexpensive instruments.

The framework of today's mobile device location systems, which exist to address the occasional failure of on-board GPS, is based on GPS, the implicit premise being that when on-board GPS fails, the network will be able to provide a GPS-based estimate of the location using cues (beacon ID's, signal strengths) supplied by the mobile device. This premise is valid if and only if the occasional failure of GPS (to provide a 2D fix) does not preclude a practically viable MDLS. While cell-tower-based systems have proven their viability in the marketplace, access-point-based systems have yet to demonstrate their viability.

To address the challenges facing today's access-point-based systems, and improve the performance of cell-tower-based systems, a new MDLS framework is disclosed. While the proposed framework is similar in many ways to the framework of today's MDLS, the differences flow from the underlying thesis that some GPS data from a point selected for measurement are better than none—that the fastest, cheapest market-ready estimate of a beacon's location may be an estimate built upon snippets of GPS data (the bulk of which yield insufficient information to generate a 2D GPS fix), measured at different times, in different places, using different instruments. This thesis, underlying the proposed framework, affects the measurement process as follows: Instead of recording a 2D GPS fix together with the ID's and signal-strengths of beacons detectable by the measuring instrument, GPS data are recorded at each point of measurement, without regard for the ability of the data to yield a 2D GPS fix. The piecemeal gathering and assembly of the snippets of GPS data to estimate location are summarized in the description of an MDLS implementation of this thesis (see below).

A convenient corollary of this thesis is that it enables the enlistment of subscribers in the measurement process. Under the current framework, subscribers do not participate in the measurement process, requesting location services when GPS has failed to yield a 2D fix. Under the proposed framework, a request for location service could include GPS data, even though GPS has failed to produce a 2D fix, along with the ID's and signal strengths of any beacons detectable by the subscriber's mobile device. (To the extent a subscriber supplies any information for the purpose of obtaining his or her location, he or she has voluntarily disclosed his or her location; hence the proposed enlistment introduces no issues of privacy.)

A not-inconvenient corollary of this thesis is that while it facilitates the location of beacons; it does not directly address the challenge of generating signal-strength contours. Nevertheless, given the fact that the utility of signal-strength contours diminishes with the range of the beacon, the potential of the proposed framework to tip the scales toward access-point-based systems and services is undiminished.

Last but not least, this thesis, and the resulting framework, favor a thin-client implementation, which, in turn, enables the application of sophisticated signal processing techniques to reduce significantly the minimum signal strength required to acquire GPS satellites FIG. 2 describes an MDLS embodying the proposed framework. In this embodiment, the measurements are presumed to include time-stamped GPS data (also referred to as a datagram) together with the ID's and received signal strength indicators (RSSI's) of any beacons detectable by the measuring instrument, which may be a subscriber's mobile device. In the MDLS of FIG. 2, the time-stamp is included as a cue to assist in the processing of GPS signals, and need not be precise. These measurements are processed by GPS Signal Processor (GPSP) to extract three or more hyperplanes of location if four or more satellite signals of sufficient strength are present, and if not, to extract one or two hyperplanes of location if two or three satellite signals of sufficient strength are present. If, from a single measurement, three or more hyperplanes of location are generated, the GPSP constructs a 2D fix (from the three or more hyperplanes) for use in the generation or update of a signal-strength contour, and then deconstructs the 2D fix into exactly three hyperplanes for use in the generation or update of the estimate of the beacon's location. The processed measurements are then catalogued, by beacon, in the Beacon Survey Database. When sufficient surfaces of location or 2D fixes have been catalogued for a specific beacon, which event could be triggered by a subscriber's request, the Beacon Location/Signal-Strength Contour Engine computes a an estimate of the beacon location or signal-strength contour and adds it to the BLDB, where it immediately becomes available for use in servicing subscriber requests. When a surface of location or a 2D fix is catalogued for a beacon whose location or signal—strength contour has already been estimated, the BLEN updates its earlier estimate and posts it to the BLDB. The MLEN is identical to that of FIG. 1.

The MDLS of FIG. 2 illustrates the thin-client approach to the extraction of GPS satellite signals from the composite GPS signal. First, instead of compiling a database of beacon locations from three-satellite fixes, the proposed framework envisions a database of beacon locations compiled incrementally from "spheres and hyperplanes". To the extent that "spheres and hyperplanes" (requiring one and two satellites, respectively) are more readily acquired than 2D fixes (requiring three satellites) when indoors, where GPS signals are generally scarce, this framework enables the faster, cheaper compilation of market-ready beacon location databases. Furthermore, the enlistment of subscribers in the compilation of the database ensures that once up and running, the database will be maintainable at modest cost.

Second, instead of performing the compute-intensive (and therefore battery depleting) signal processing task at the point of measurement, it is performed offline, where powerful servers are available to implement sophisticated (and generally more compute-intensive) signal processing techniques to maximize the processing gain, reducing the minimum signal strength required to acquire a GPS satellite.

One such technique looks to large datagrams (recordings of the composite GPS signal) as the means to improve signal processing gain. This technique has recently become practical (cf. pending U.S. patent application Ser. No. 12/587,096 and Ser. No. 12/587,099) with the application of a perfect reference.

In accordance with the present invention, a method for estimating the location of a beacon from an ensemble of measurements associated with said beacon, where, contained in each measurement, are GPS data from which surfaces of location may be extracted, together with the ID's of beacons detectable at the point of measurement, is disclosed; said method comprising extracting the canonical set of surfaces of location implicit in each of the associated measurements, and determining the estimate of the location of the beacon as the point for which the sum of the squares of the distances to each of the set of surfaces of location so extracted is minimized.

Also disclosed is a system for the estimation of beacon locations from measurements containing a time-stamped recording of the composite GPS signal (which recording is referred to as a datagram), together with the ID's and associated signal strengths of beacons detectable at the point of measurement; said system comprising:

GPS signal processing means for extracting, from each time-stamped datagram, the canonic set of surfaces of location, and beacon location estimation means for estimating the location of a beacon from an ensemble of surfaces of location associated with said beacon.

In one embodiment of the foregoing system, the GPS signal processing means extracts the canonic set of surfaces of location from datagrams spanning multiple cycles of GPS' 50 Hz data overlay, extending processing gain to its practical limit.

In another embodiment, the GPS signal processing means uses a perfect reference, to enable efficient processing of large datagrams.

Those skilled in the art will understand that the methods and apparatus of the present invention may be applied to satellite positioning systems evolved from the GPS satellite positioning system, including but not limited to the Galileo and Glasnost systems.

Various aspects and features of the present invention may be understood by examining the drawings here listed.

DETAILED DESCRIPTION OF THE INVENTION

Figure 1:
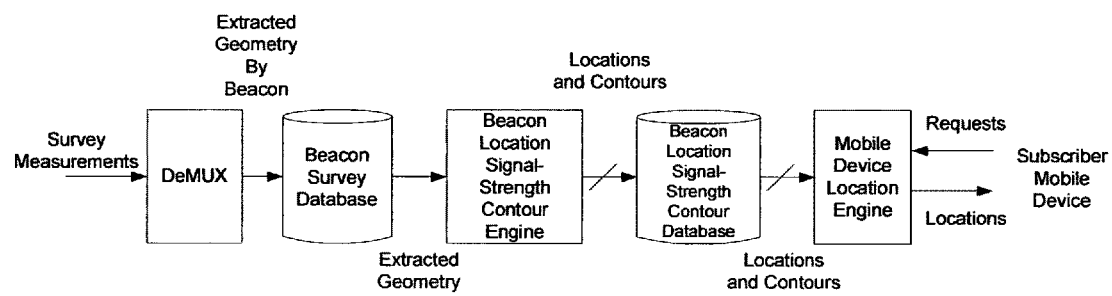
FIG. 1 shows a system diagram of a prior art mobile device location system (MDLS)

In general, the object of the present invention is to provide an MDLS framework to enable the rapid and inexpensive compilation and maintenance of a comprehensive Beacon Survey Database, with the accuracy required by current and contemplated location-based applications. As the repository for field measurements, applied ultimately to estimate the locations of subscribers' mobile devices, the Beacon Survey Database influences virtually every metric of importance to the operators as well as the subscribers of location services. Measurements must be easily and efficiently obtained, using accurate but inexpensive instruments.

The framework of today's mobile device location systems, which exist to address the occasional failure of on-board GPS, is based on GPS, the implicit premise being that when on-board GPS fails, the network will be able to provide a GPS-based estimate of the location using cues (beacon ID's, signal strengths) supplied by the mobile device. This premise is valid if and only if the occasional failure of GPS (to provide a 2D fix) does not preclude a practically viable MDLS. While cell-tower-based systems have proven their viability in the marketplace, access-point-based systems have yet to demonstrate their viability.

To address the challenges facing today's access-point-based systems, and improve the performance of cell-tower-based systems, a new MDLS framework is disclosed. While the proposed framework is similar in many ways to the framework of today's MDLS, the differences flow from the underlying thesis that some GPS data from a point selected for measurement are better than none—that the fastest, cheapest market-ready estimate of a beacon's location may be an estimate built upon snippets of GPS data (the bulk of which yield insufficient information to generate a 2D GPS fix), measured at different times, in different places, using different instruments. This thesis, underlying the proposed framework, affects the measurement process as follows: Instead of recording a 2D GPS fix together with the ID's and signal-strengths of beacons detectable by the measuring instrument, GPS data are recorded at each point of measurement, without regard for the ability of the data to yield a 2D GPS fix. The piecemeal gathering and assembly of the snippets of GPS data to estimate beacon location is detailed in the description of an MDLS implementation of this thesis (see below).

In the estimation of signal-strength contours, single-measurement 2D fixes (rather than multi-measurement 2D fixes) are necessary. These may be generated from three satellites and a pseudo satellite (2D mode), from four satellites (3D mode), or from more than four satellites, as described below.

A convenient corollary of this thesis is that it enables the enlistment of subscribers in the measurement process. Under the current framework, subscribers do not participate in the measurement process, requesting location services when GPS has failed to yield a 2D fix. Under the proposed framework, a request for location service could include GPS data, even though GPS has failed to produce a 2D fix, along with the ID's and signal strengths of any beacons detectable by the subscriber's mobile device. (To the extent a subscriber supplies any information for the purpose of obtaining his or her location, he or she has voluntarily disclosed his or her location; hence the proposed enlistment introduces no issues of privacy.)

A not-inconvenient corollary of this thesis is that while it facilitates the location of beacons; it does not directly address the challenge of generating signal-strength contours. Nevertheless, given the fact that the utility of signal-strength contours diminishes with the range of the beacon, the potential of the proposed framework to tip the scales toward access-point-based systems and services is undiminished.

Last but not least, this thesis, and the resulting framework, favor a thin-client implementation, which, in turn, enables the application of sophisticated signal processing techniques to reduce significantly the minimum signal strength required to acquire GPS satellites.

As indicated above, GPS data can be recorded in a variety of formats, varying from perhaps the most compact format, a 2D GPS fix, to perhaps the least compact format, a digitized recording of the composite GPS signal. In between are numerous possibilities, from the start-of-transmission and the time of arrival (TOA) of a transmission from an identified GPS satellite, to the start-of-transmission for each of two identified GPS satellites, together with the difference in their times of arrival (TDOA).

Adopting a geometric perspective on the estimation of the location of a beacon, consider the simplest case: namely, estimation based on 2D fixes. Without weighting the fixes for signal strength or geographic distribution or whatever, the location of a beacon may be estimated by simply averaging the associated 2D fixes. If, instead of 2D fixes, measurements for a particular beacon were taken at different times and in different places, and with each measurement, the recorded GPS data included the start-of-transmission and the TOA from identified GPS satellites, the effect would be to generate spheres of location, centered on the identified satellites, each with radius equivalent to the (computed) distance to said satellite. While the actual 2D locations of these measurements would forever be unknown, the general locations of these measurements would be known by the spheres on whose surfaces they lie. Without weighting the spheres for signal strength or geographic distribution or whatever, the location of the beacon may be estimated by determining the point for which the sum of the squares of the distances to the surfaces of the associated spheres is minimized. (This approach is equivalent to determining the point for which the sum of the squares of the errors in the associated TOA's is minimized.) In this case, all that is needed is one (not three) acquirable satellites per measurement—and an accurate clock, to measure TOA's. It should be noted that the accuracy required of the clock is severe, and in the general case may make single-satellite measurements impractical. A special case, where four or more satellites are available (and, implicitly, an accurate clock) could prove to be the "exception to the rule", should privacy considerations impose a limit on the amount of third-party location information accessible to a location service provider.

But to get around the requirement for an accurate clock does not require three acquirable satellites; two will do. If measurements for a particular beacon were taken at different times and in different places, and with each measurement, the recorded GPS data included the start-of-transmission for each of two identified satellites, together with the TDOA, the effect would be to generate hyperplanes of location, each with its apex on, and its axis collinear with, the line joining the two identified satellites. If a third satellite were acquirable, and the difference in its time of arrival relative to that of either of the first two satellites were measured, the effect would be to generate two hyperplanes of location for that measurement. While the actual 2D locations of these measurements would forever be unknown, the general locations of these measurements would be known by the hyperplanes on whose surfaces they lie. Without weighting the hyperplanes for signal strength or geographic distribution or whatever, the location of the beacon may be estimated by determining the point for which the sum of the squares of the distances to the surfaces of the hyperplanes is minimized. Alternatively, the location of the beacon may be estimated by determining the point for which the sum of the squares of the errors in the associated TDOA's is minimized. However the estimate is derived, the measurements employed require a minimum of two acquirable satellites—and an ordinary clock.

As an aside, it is important to note that the minimization of the sum of the squares of the errors in TOA's and/or TDOA's or of the sum of the squares of the distances to spheres and/or hyperplanes, for example, is but one of many objective functions, contemplated in the present invention, for minimizing beacon location estimation error. Another well-known objective function is min/max, wherein the maximum distance from the estimated location to the surfaces of spheres and/or hyperplanes is minimized. Simple modifications to the foregoing would be to weight the measurements (specifically the associated spheres and/or hyperplanes) within the minimization. Numerous weightings are available to enable high quality estimates. Measurement might be weighted by received signal strength, by time (age), or by a weighting designed to discriminate against "outliers"—measurements that are suspect by virtue of their deviation from the established norm, or by any combination of the foregoing.

We return to enumerating the possible ways GPS data might be recorded. The simplest way is to record the composite GPS signal, together with the ID's and signal strengths of any beacons detectable by the instrument/device, and extract the satellite signals offline. The disadvantage of this approach (occurring when a subscriber device operates as a measurement device) is the bandwidth utilized to transmit the GPS data (also called the datagram); the advantage is the potential to apply sophisticated signal processing techniques to decode large datagrams (hundreds of milliseconds in length), and enhance further the sensitivity of GPS receivers (see below). Using powerful servers, spheres (times of arrival) and hyperplanes (differences in times of arrival) are extracted from the datagrams, and posted to the Beacon Survey Database. Points (2D fixes) derived from the spheres or hyperplanes extracted from a single measurement are likewise posted to BSD for use in estimating signal-strength contours.

In the generation of spheres, hyperplanes, and points, it is important that the elemental underlying GPS satellite data be used but once in the estimation of beacon location and signal-strength contours. One way to insure against the inadvertent reuse of the underlying satellite data is to use spheres and hyperplanes exclusively in the estimation of beacon location. Furthermore it is important that overdetermined measurements are not inadvertently overweighted, owing to the possibility that more than three spheres or hyperplanes might be generated from a single measurement. Hence, the notion of a canonical set of surfaces of location: For each measurement, for each beacon detectable at the point of measurement, the canonical set is defined to be:
  a) Empty, when no satellites are acquirable,
  b) A single sphere, when exactly one satellite is acquirable—and an accurate clock is available to measure the time of arrival,
  c) One or two hyperplanes, when two or three satellites are acquirable, and
  d) Three spheres or three hyperplanes, when four or more satellites are acquirable, as long as limits imposed by privacy considerations are observed.

When, in case (d), more than four satellites are acquirable, single-measurement 2D fixes may be constructed using techniques such as the least-squares minimization described above for estimating the location of beacons, and then deconstructed into three spheres or three hyperplanes for use in estimating beacon locations.

As the foregoing illustrations reveal, the proposed framework has much in common with the framework of today's MDLS. Whether the beacons are cellular towers or Wi-Fi access points (or the beacon of the future)—the proposed measurement processes are largely identical. As with the existing framework, the measuring instruments employed are similar, if not identical, to the mobile communications devices for which the MDLS has been designed to locate. The standard mode of operation is modified, but slightly; namely, to traverse the geography of interest with the instrument, pausing periodically to record GPS data together with the ID's and signal-strengths of any beacons detectable by the instrument. As these measurements accumulate, the beacon locations and associated signal-strength contours are generated and thereafter continually updated by the BLEN, to enable the generation of accurate and reliable estimates of location in response to subscriber requests. In a departure from today's MDLS, the subscriber's mobile device (assuming on-board GPS) serves as an instrument in the ongoing measurement process.

Figure 2:
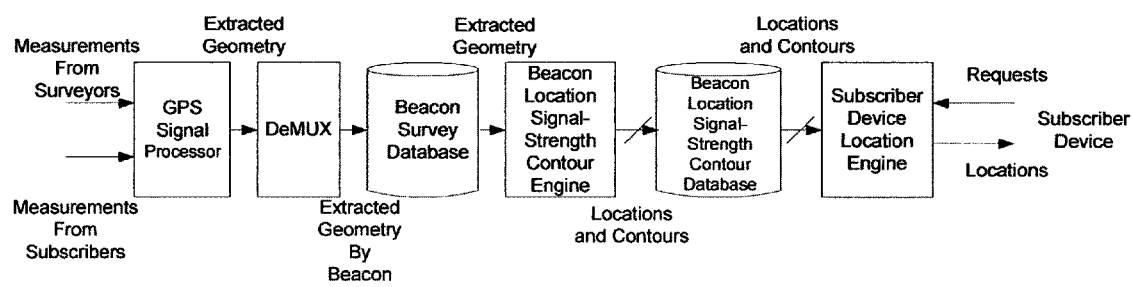
FIG. 2 shows a system diagram of a MDLS employing the present invention

FIG. 2 describes an MDLS embodying the proposed framework. In this embodiment, the measurements are presumed to include time-stamped datagrams (digitized GPS signals) together with the ID's and received signal strength indicators (RSSI's) of any beacons detectable by the measuring instrument, which may be a subscriber's mobile device. The time-stamp is included as a cue to assist in the processing of GPS signals, and need not be precise. These measurements are processed by GPS Signal Processor (GPSP) to extract three or more hyperplanes of location if four or more satellite signals of sufficient strength are present, and if not, to extract one or two hyperplanes of location if two or three satellite signals of sufficient strength are present. If, from a single measurement, three or more hyperplanes are generated, the GPSP constructs a 2D fix (from the three or more hyperplanes) for use in the generation or update of a signal-strength contour, and then deconstructs the 2D fix into exactly three hyperplanes for use in the generation or update of the estimate of the beacon's location. The processed measurements are then catalogued, by beacon, in the Beacon Survey Database. When sufficient surfaces of location (for beacon estimation) or 2D fixes (for contour estimation) have been catalogued for a specific beacon, which event could be triggered by a subscriber's request, the Beacon Location/Signal-Strength Contour Engine computes a an estimate of the beacon location or signal-strength contour and adds it to the BLDB, where it immediately becomes available for use in servicing subscriber requests. In the MDLS of FIG. 2, the cataloguing of two surfaces of location is sufficient, as BLEN applies a pseudo satellite at the earth's center to generate an initial estimate of the beacon's location. When a surface of location or a 2D fix is catalogued for a beacon whose location or signal-strength contour has already been estimated, the BLEN updates its earlier estimate and posts it to the BLDB. The MLEN is identical to that of FIG. 1.

The MDLS of FIG. 2 illustrates the thin-client approach to the extraction of GPS satellite signals from the composite GPS signal. First, instead of compiling a database of beacon locations from three-satellite fixes, the proposed framework envisions a database of beacon locations compiled incrementally from "spheres and hyperplanes". To the extent that "spheres and hyperplanes" (requiring one and two satellites, respectively) are more readily acquired where GPS signals are scarce; e.g., indoors, this framework enables the faster, cheaper compilation of market-ready beacon location databases. Furthermore, the enlistment of subscribers in the compilation of the database ensures that once up and running, the database will be maintainable at modest cost.

Second, instead of performing the compute-intensive (and therefore battery depleting) signal processing task at the point of measurement, it is performed offline, where powerful servers are available to implement sophisticated (and generally more compute-intensive) signal processing techniques to maximize the processing gain, reducing the minimum signal strength required to acquire a GPS satellite.

One such technique looks to large datagrams (recordings of the composite GPS signal) as the means to improve signal processing gain. This technique has recently become practical (cf. pending U.S. patent application Ser. No. 12/587,096 and Ser. No. 12/587,099) with the application of a perfect reference. To appreciate the potential of this technique requires some background in GPS signal processing.

GPS Signals and Signal Processing Technique

The signals from all GPS satellites are broadcast synchronously, using the same carrier frequency, 1.57 GHz in the case of the NAVSTAR system. However, each satellite has a unique identifier, or pseudorandom noise (PRN) code having 1023 chips, thereby enabling a GPS receiver to distinguish the GPS signal from one GPS satellite from the GPS signal from another GPS satellite. In addition, each satellite transmits information allowing the GPS receiver to determine the exact location of the satellite at a given time. The GPS receiver determines the distance (pseudo range) from each GPS satellite by determining the time delay of the received signal. Given the exact locations and the pseudo ranges, the estimation of 2D location coordinates can be accomplished with as few as two satellite pseudo ranges, provided they have been measured using an accurate time reference. Since this is impractical with current GPS navigational platforms, the computation of 2D location coordinates is generally accomplished using three pseudo ranges. Once the pseudo ranges for at least three GPS satellites have been determined, it is a straightforward process to determine the location coordinates of the GPS receiver.

Figure 3:
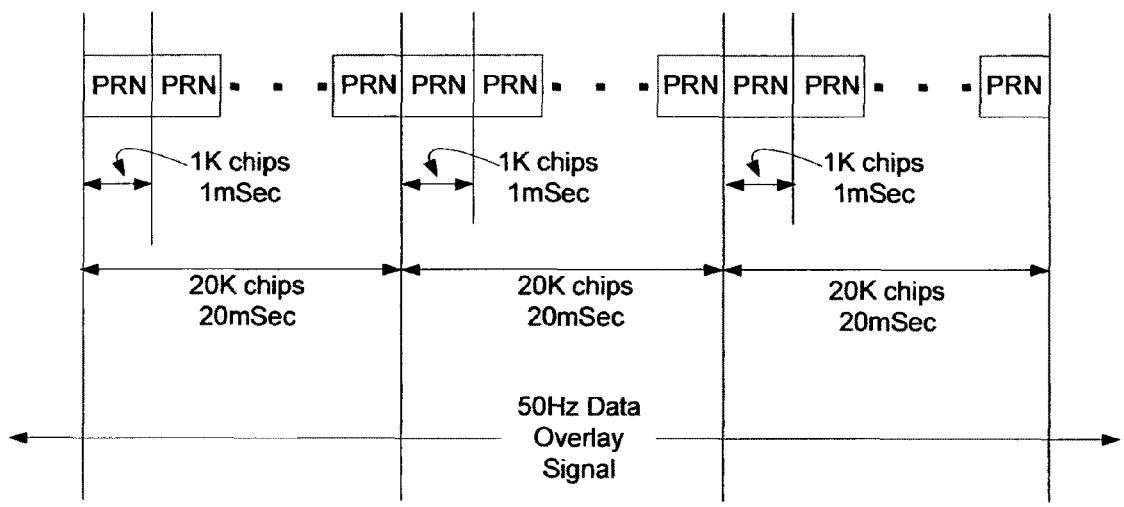
FIG. 3 describes the data structure transmitted by a GPS satellite

FIG. 3 describes the data structure of the signal that is broadcast by each GPS satellite; as illustrated, the signal consists of a 50 Hz data overlay signal –20 millisecond data bits—modulating a one millisecond PRN code interval of 1023 bits or chips. The PRN code is known as a spreading code because it spreads the frequency spectrum of the GPS signal. This spread spectrum signal is known as a direct sequence spread spectrum (DSSS) signal.

Figure 4:
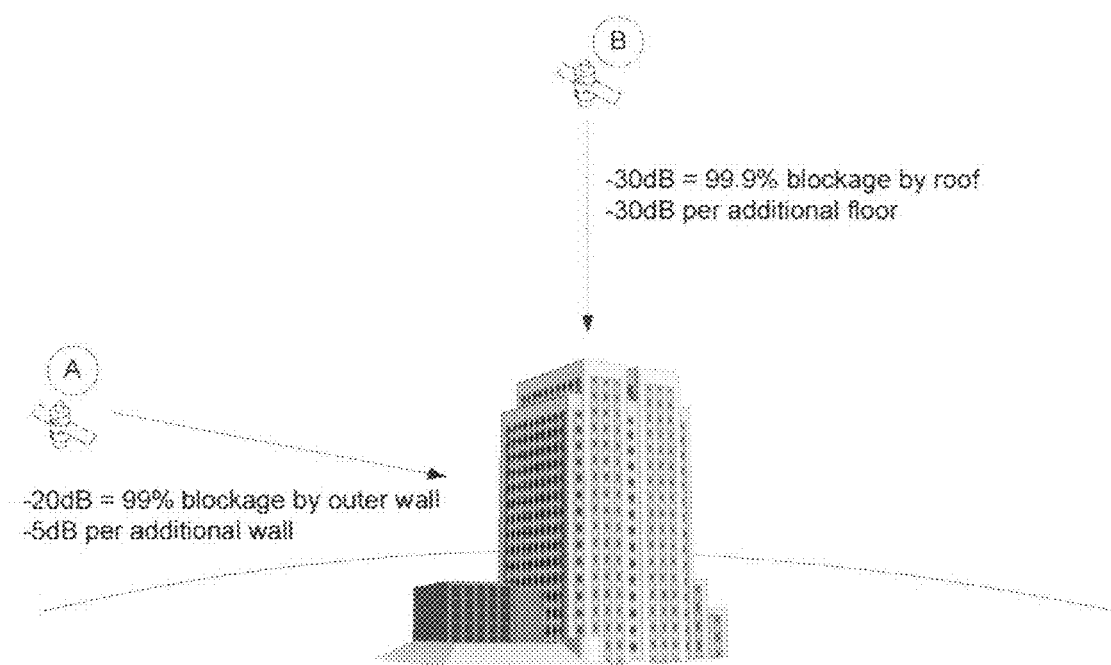
FIG. 4 illustrates the nature of path losses experienced by satellite signals penetrating commercial buildings

Indoors, satellite signals suffer severe path losses as they are forced to penetrate windows, walls, and ceilings enroute to the receiver. Commercial buildings, in particular, introduce severe path losses (FIG. 4). Along the vertical, the roof and each intermediate floor contribute losses of estimated at 30 db. Exterior walls provide an estimated loss of 20 db, with interior walls adding 5 db each. Clearly, the indoor environment favors satellites near the horizon (over those directly above).

Figure 5:
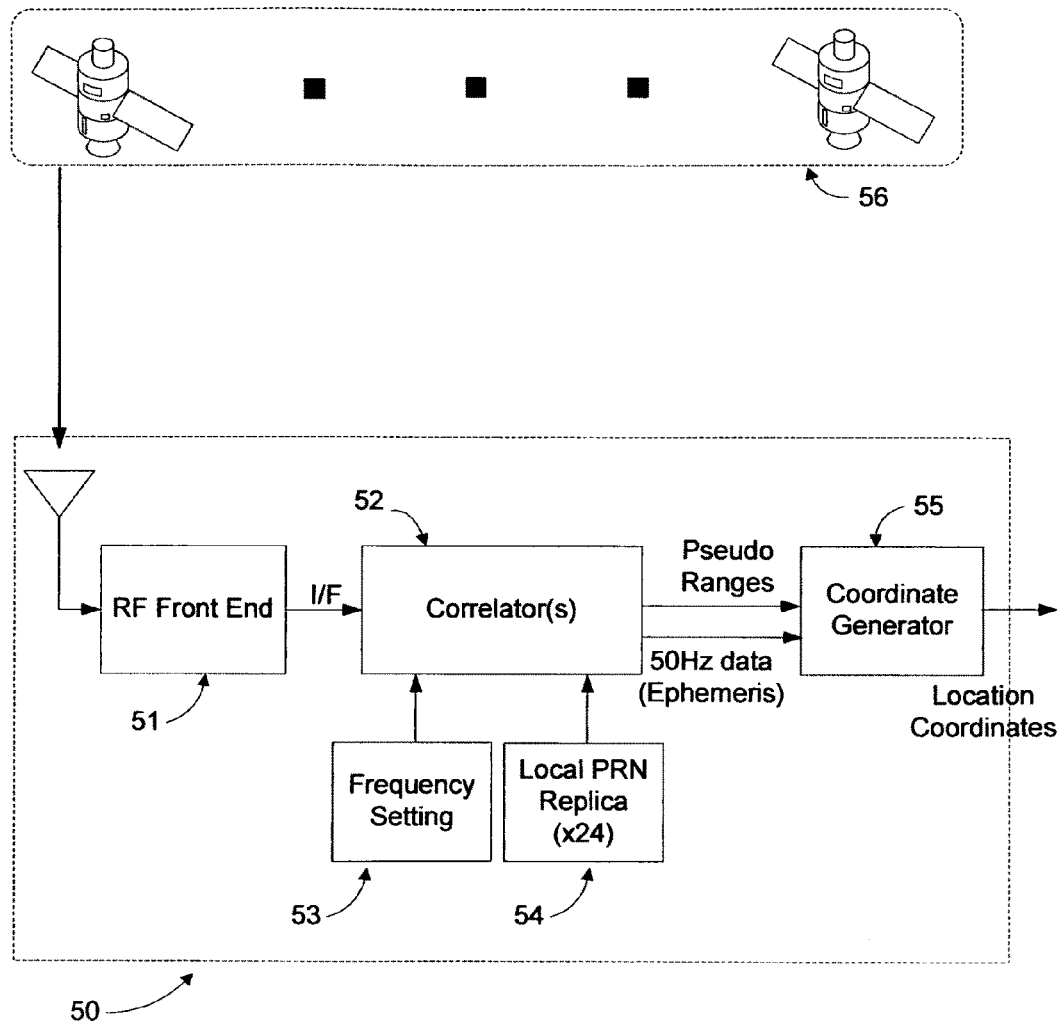
FIG. 5 shows a block diagram of a prior art GPS receiver

FIG. 5 illustrates a block diagram of a prior art GPS receiver. The GPS signal from GPS satellite constellation 56 is received by the R/F front end 51 of GPS receiver 50. R/F front end 51 down converts the 1.57 GHz R/F signal, resulting in an intermediate frequency (I/F) signal. The streaming I/F signal is examined by a correlator or bank of correlators 52, employing a search algorithm to confirm the presence or absence, within the composite GPS signal, of the uniquely coded signals from the GPS satellites. In a typical search algorithm, the local frequency 53 is scanned across a range of frequencies; for each frequency, a series of correlations involving the incoming GPS signal and all possible code phases of a local replica 54 of the designated satellite's PRN code are used to "acquire" the designated satellite (i.e., establish the presence of the designated satellite signal within the composite GPS signal). In order to ensure that the correct code phase is not missed due to local clock off-set, it is conventional to increment the local replica code phase in one-half chip or even smaller steps. The granularity of these steps is limited by the amount of over sampling that is performed on the incoming I/F signal. A high correlation peak value indicates that the designated satellite is present, and its signal, decodable. If no correlations peaks are high enough, the local frequency 53 is set to a second trial frequency and the correlations are repeated. Once pseudo range information has been obtained for at least three GPS satellites along with the corresponding satellite timing information, the coordinate generator 55 determines the two-dimensional location coordinates of GPS receiver 50.

To obtain a first fix, GPS receiver 50 must (1) acquire a minimum of three GPS satellites by tuning the local frequency 53 and the code phase of the local PRN code replica 54 in the GPS receiver to match the carrier frequency and the PRN code phase of each of the electronically visible (i.e., decodable) satellites. The search for correlation peaks of sufficient strength to enable the extraction of reliable pseudo range information is a time-consuming process, and failure-prone in indoor and urban canyon environments.

Figure 6:
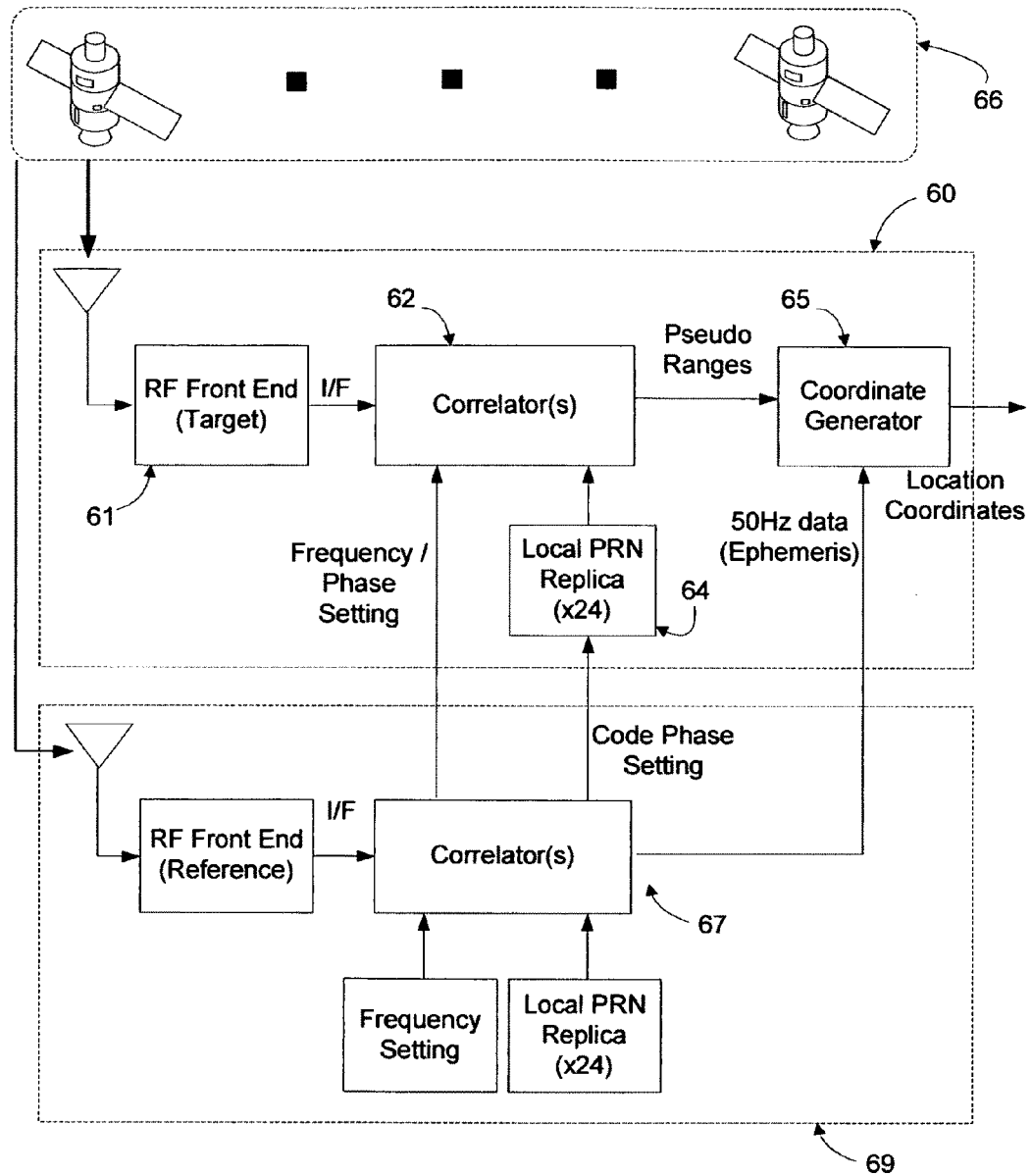
FIG. 6 shows a block diagram of a prior art assisted-GPS receiver FIG. 7 describes the output of a correlator FIG. 8 describes the output of a correlator FIG. 9 describes the output of a correlator FIG. 10($a$) describes a robust GPS assistance system FIG. 10($b$) describes a robust GPS assistance system

To minimize the time to first fix (TTFF) of GPS receivers such as GPS receiver 50, the concept of a GPS assistance system has been introduced (see FIG. 6). The role of GPS assistance system 69 is to track the satellites electronically visible at the site of GPS assistance system 69, and provide assistance, in the form of carrier frequency and PRN code phase information to GPS receiver 60 in the vicinity of GPS assistance system 69. As in the case of GPS receiver 50, the GPS signal from GPS satellite constellation 56 is received by the R/F front end 61 of GPS receiver 60. R/F front end 61 down converts the 1.57 GHz R/F signal, resulting in an intermediate frequency (I/F) signal. The streaming I/F signal is examined by a correlator or bank of correlators 62, which is used to acquire satellites. To expedite the acquisition process, carrier frequency and PRN code phase information derived by GPS assistance system 69, in the course of tracking acquirable satellites, is transmitted to GPS receiver 60. This information is used to initialize the search algorithm, enabling the algorithm to operate more efficiently and more effectively. As a result the TTFF is significantly reduced, and receive sensitivity is improved marginally, to the extent that information provided enables the acquisition of satellites otherwise electronically invisible (that is to say, their signals are not decodable) to GPS receiver 60. Once pseudo range information has been determined for three GPS satellites, the location coordinates are determined by coordinate generator 65.

Care must be taken in the generation of GPS assistance data, to insure the integrity of data for satellites at or near the horizon, as these may be the satellites most visible indoors. If GPS assistance data are generated from GPS signals taken in the clear, for example, strong overhead satellite signals could compromise the integrity of GPS assistance data generated for weaker satellites at or near the horizon.

Figure 7B:
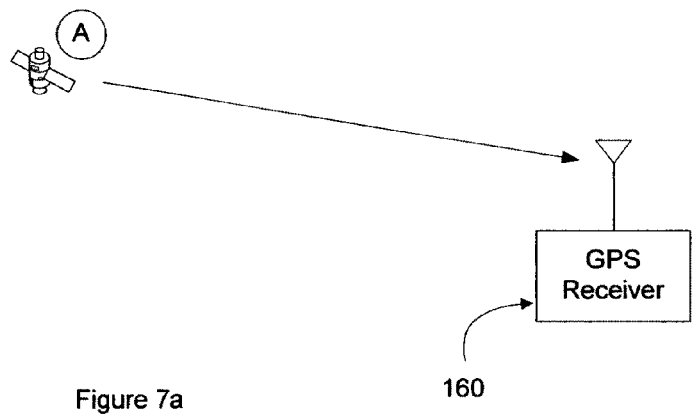
Figure 7B:
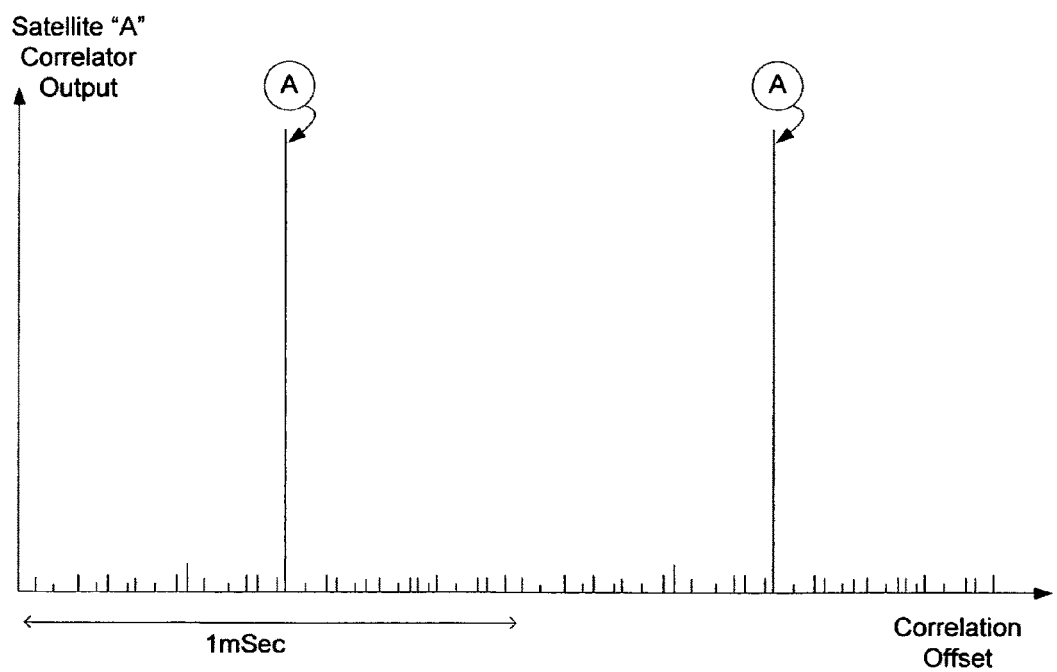
Figure 8A:
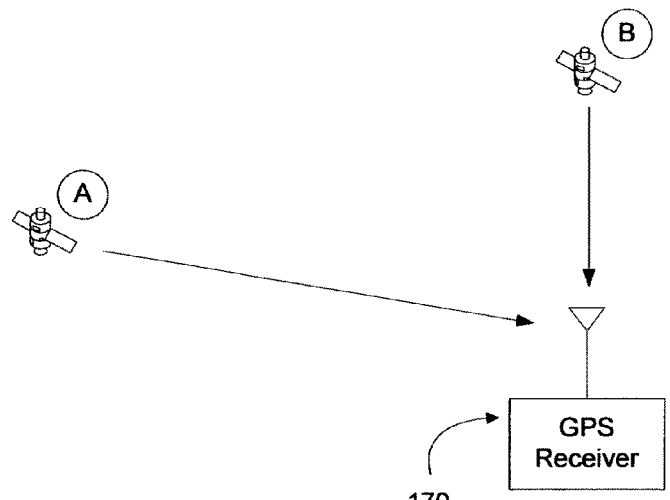
Figure 8B:
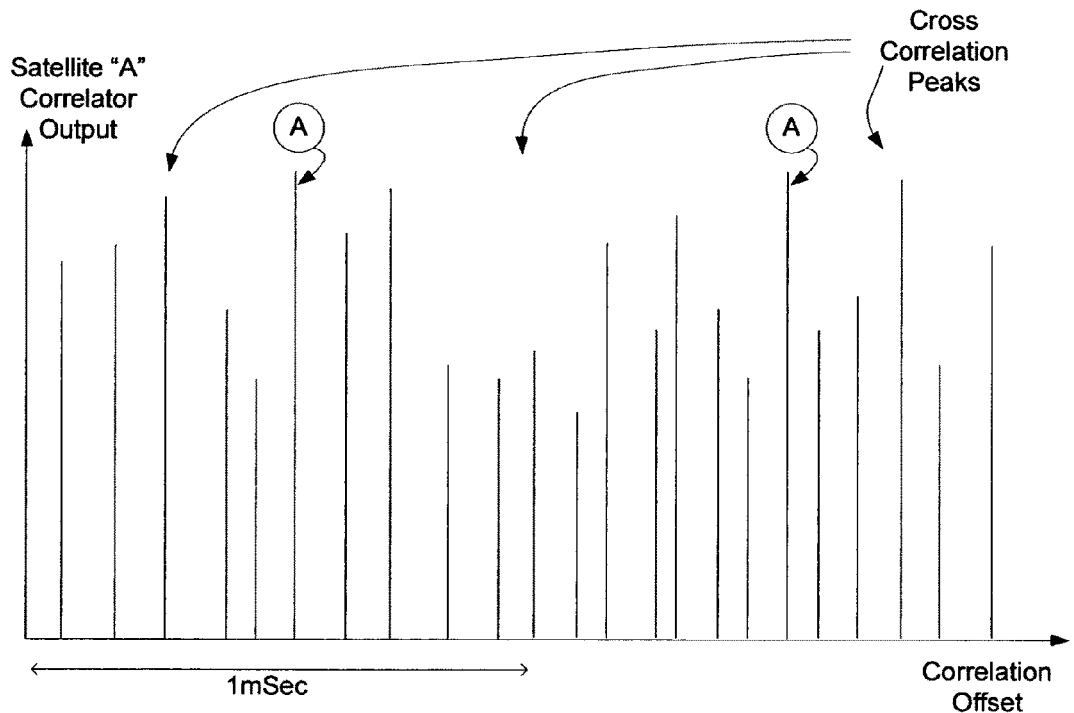
Figure 9A:
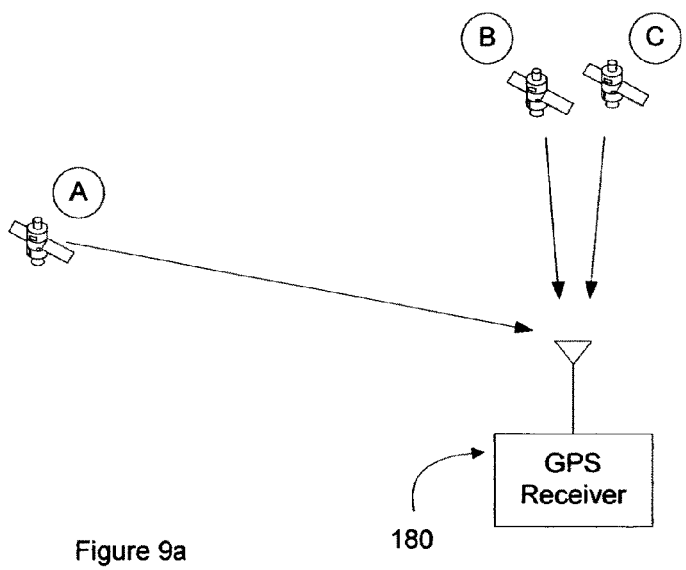
Figure 9B:
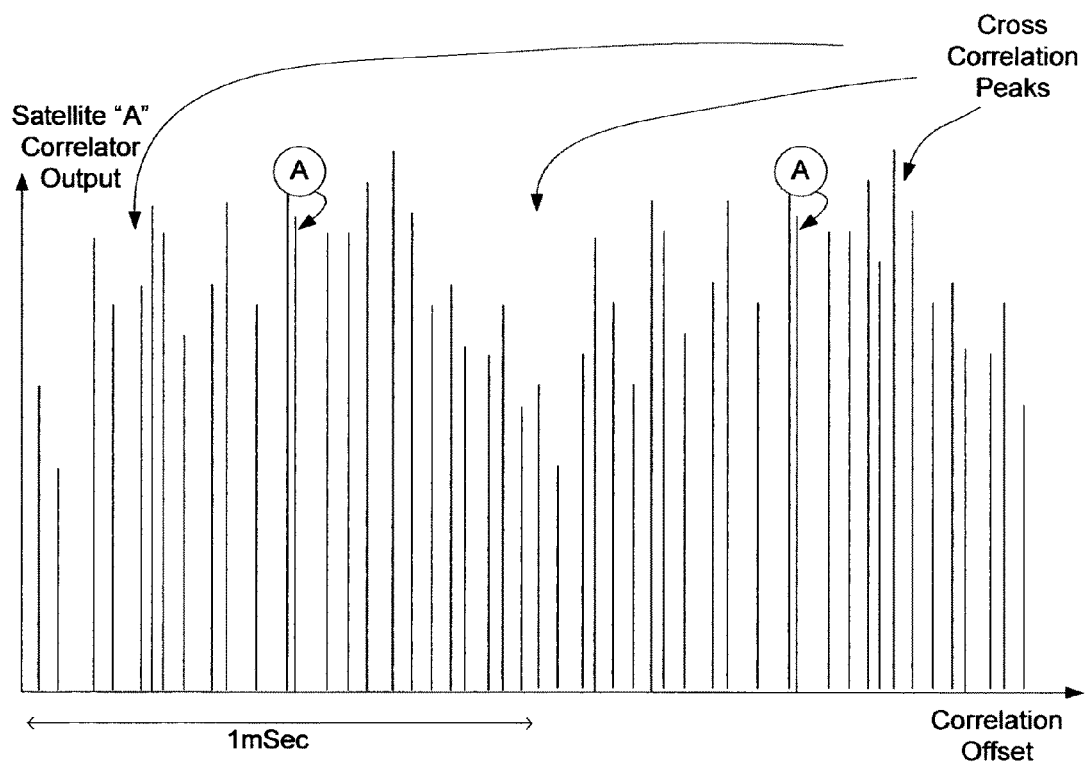

The potential for strong satellite signals to interfere in the tracking of weak satellite signals is an artifact of the correlation process which serves as the foundation for GPS satellite signal acquisition and tracking techniques. This is illustrated in FIGS. 7-9. FIG. 7 describes the output of the correlation of the composite GPS satellite signal with the PRN code for weak satellite A, as it would appear if all other GPS satellites were turned off. A distinct peak in the correlator output marks the presence of (a signal from) satellite A. In FIG. 8, strong satellite B has been turned on, and the output of the correlator has changed, revealing prominent cross correlation peaks owing to the relative strength of (the signal from) satellite B. In FIG. 9, a second strong satellite C has been turned on, adding additional prominent cross correlation peaks to the correlator output. These figures illustrate how the search for the autocorrelation peak corresponding to weak satellite A is complicated, if not completely frustrated, by the prominent cross correlation peaks introduced by the strong satellites B and C.

Figure 10A:
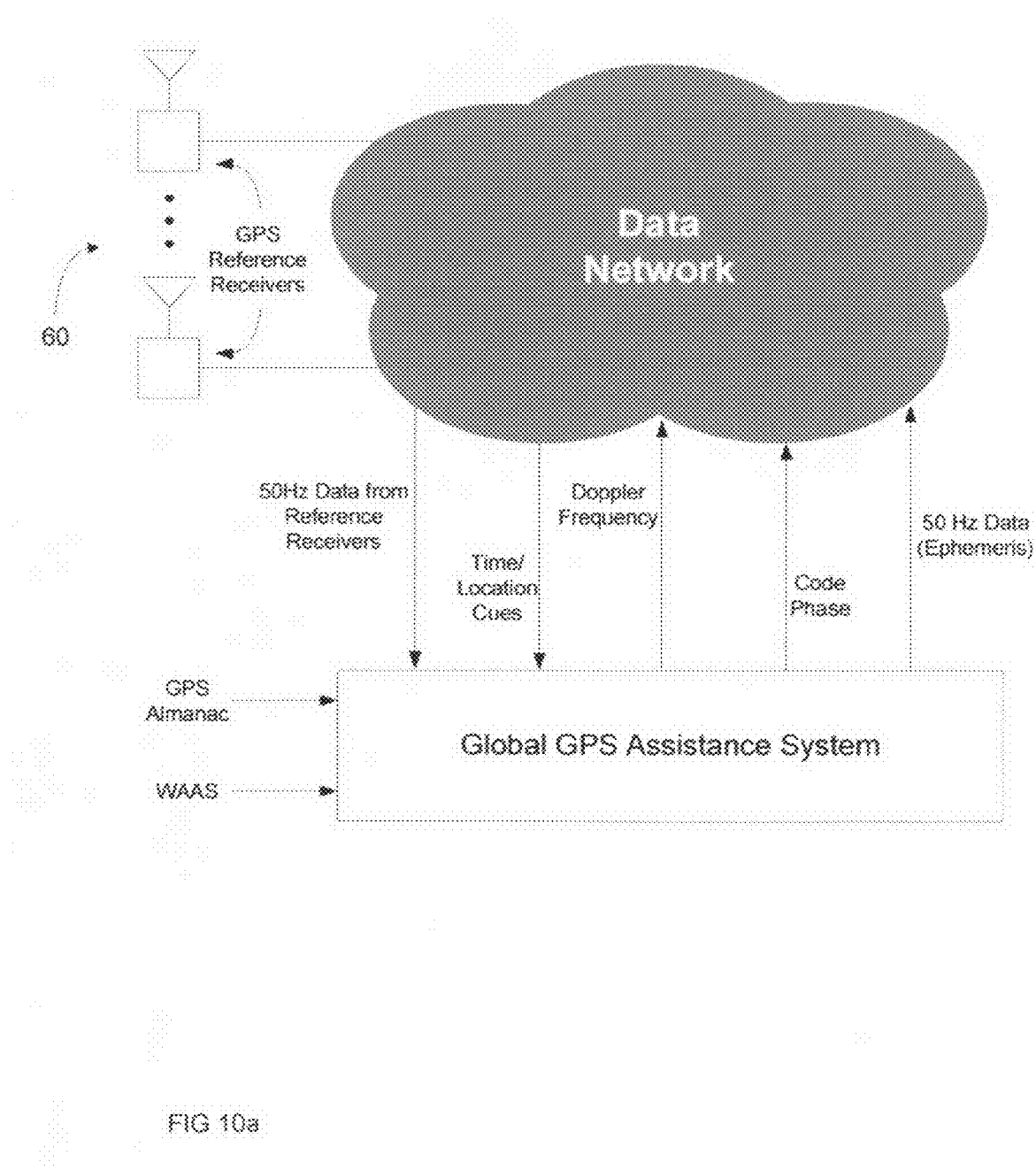
Figure 10B:
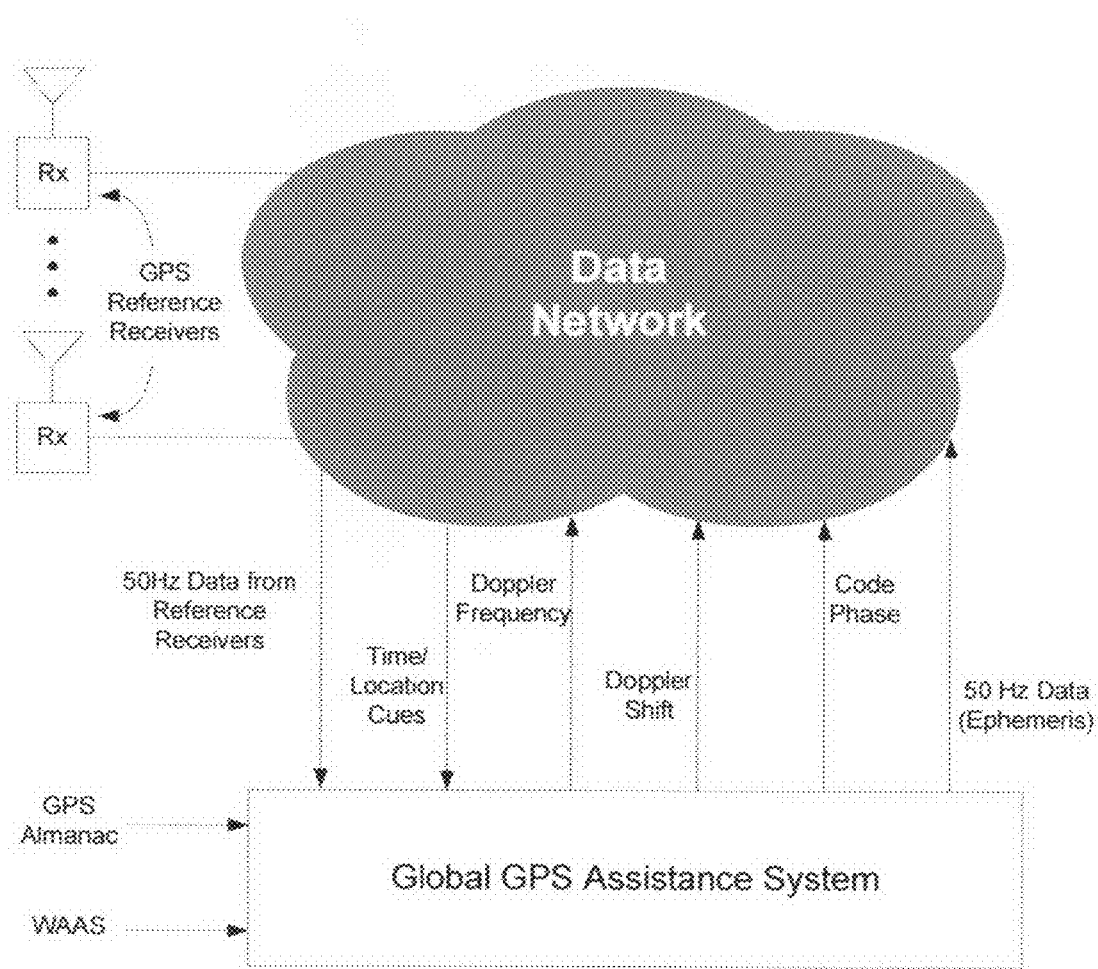

To insure the integrity of GPS assistance data for satellites at or near the horizon, a global alternative to GPS assistance system 69 is proposed. This Global GPS Assistance System (GGAS) is described in FIG. 10(a). GGAS is the hub of a world-wide GPS assistance service in which GPS receivers such as GPS receiver 60 are clients. By deploying a (small) number of GPS receivers strategically around the globe, each of the 24-32 satellites are tracked without strong-signal interference, contributing to a more robust GPS assistance system. The 50 Hz data from each of the satellites, recorded at the globally deployed GPS receivers, is stored and forwarded (to client GPS receivers) from GGAS. In addition, GPS almanac information and Wide Area Atmospheric Services (WAAS) information are aggregated by GGAS and applied to generate Doppler frequency and code phase offset information in response to client-supplied time and location cues. FIG. 10(b) describes a second embodiment of the GGAS concept. In this embodiment, the GPS assistance data includes the rate of change of the carrier frequency (Doppler shift), as well as Doppler frequency, code phase offset, and the 50 Hz data steam, for each potentially acquirable satellite.

The utility of GGAS extends beyond conventional thick-client implementations of GPS for sensor location; indeed, GGAS provides an ideal foundation for sophisticated thin-client implementations of GPS for beacon location, such as the MDLS of FIG. 2.

Thin-Client GPS

Figure 11:
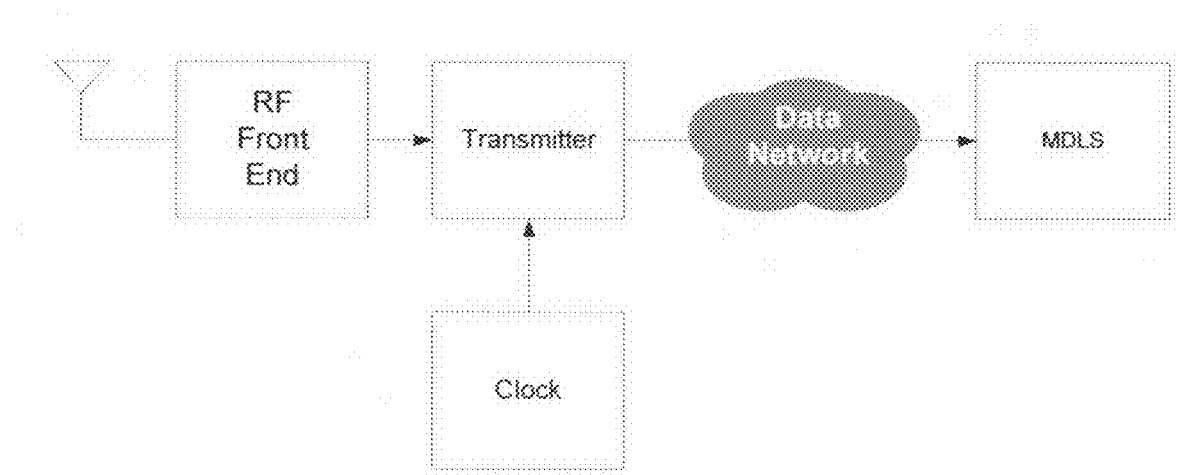
FIG. 11 shows a block diagram of a thin GPS client used in a thin-client implementation of a GPS signal processing system employing the present invention
Figure 12:
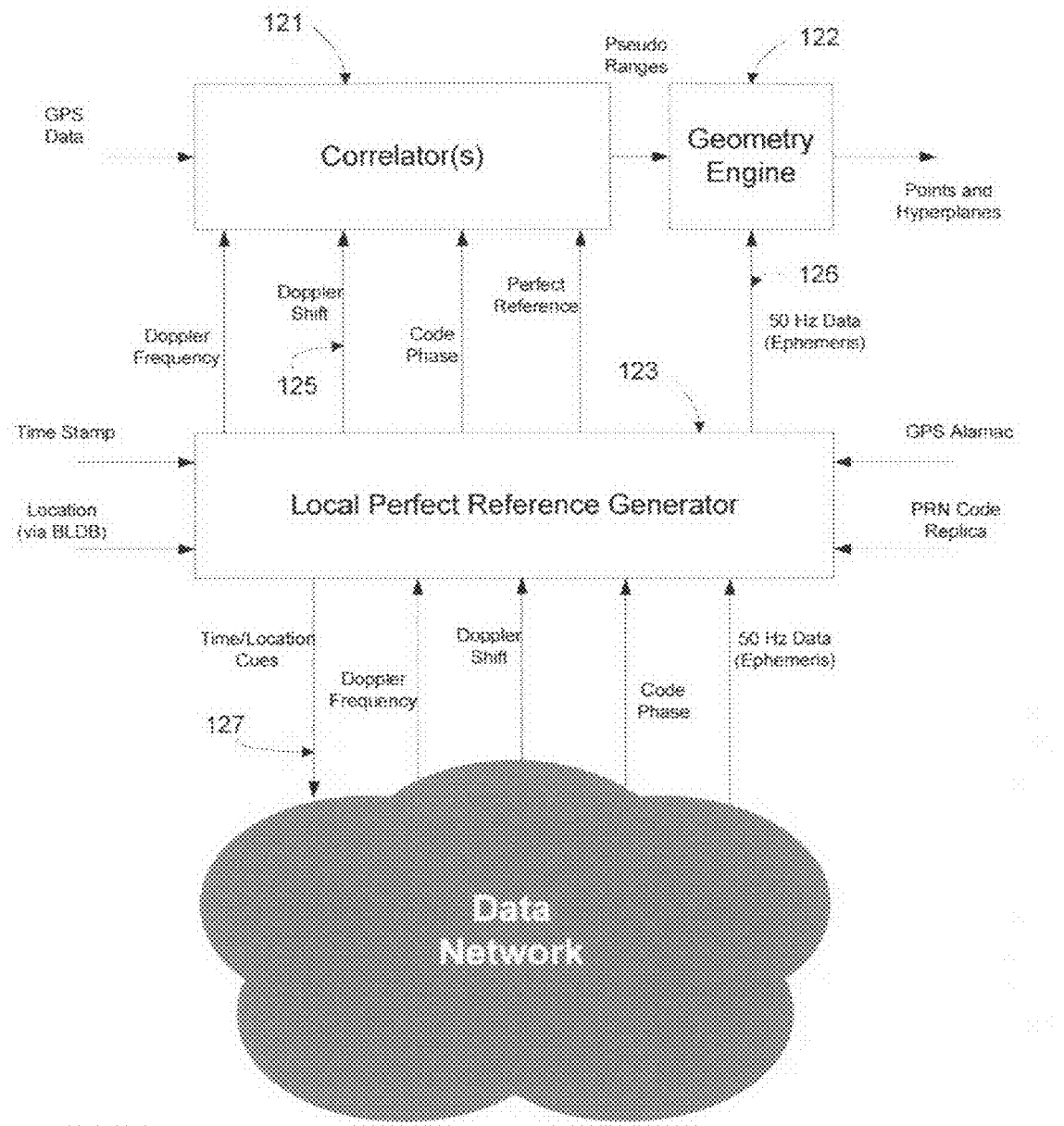
FIG. 12 shows a block diagram of a GPS server used in a thin-client implementation of a GPS signal processing system employing the present invention

In the compilation of beacon location databases utilizing the MDLS of FIG. 2, the GPS client contained in the measuring instrument/mobile device is a minimal subset of the thick client contained in conventional GPS-equipped mobile devices (FIG. 11). All that is required is an antenna, an RF front end, a clock (which need not be precise) and a transmitter to enable GPS data to make their way to the MDLS server. The server component (GPSP) is more complex. FIG. 12 details one embodiment of the GPSP of FIG. 2.

As described previously, each measurement contains beacon-specific as well as measurement-specific information. In the category of measurement-specific information are the time stamp and the datagram. The GPSP of FIG. 12 requires, in addition, a location cue, which in the steady-state is satisfied by matching the beacon presenting the strongest signal with its estimated location in BLDB. In early survey measurements, it may be satisfied by the most recently recorded 2D GPS fix.

As shown in FIG. 12, the GPS data is input to Correlator (or bank of correlators) 121. Correlator 121 correlates the datagram, parsed from the received measurement, with the perfect references for each of the potentially acquirable satellites to determine pseudo ranges to those satellites acquirable after the fact. Apart from the fact that the perfect reference substitutes for the PRN code replica present in prior art, Correlator 121 differs only in its inclusion of an additional element of assistance data; namely, Doppler Shift 125. The pseudo ranges are processed by Geometry Engine 122, using ephemeris data 126 originating with the Global GPS Assistance System (GGAS), and forwarded by Local Perfect Reference Generator (LPRG) 123. The Geometry Engine of FIG. 12 provides hyperplane output for the estimation of beacon locations, and 2D fixes for the estimation of signal-strength contours. This portion of the datapath is not unconventional.

The unconventional element of the GPSP of FIG. 12 revolves around Local Perfect Reference Generator 123. As the figure shows, the outputs of LPRG 123 consist of cues 127, received by LPRG 123, and forwarded (by LPRG 123) over the network, to a Global GPS Assistance System (GGAS); cue-specific GPS assistance data received from the GGAS and forwarded (by LPRG 123) to Correlator 121 and to Geometry Engine 122; and the local perfect reference for each potentially acquirable satellite. Inputs to LPRG 123, forwarded as cues 127 to GGAS, include the time stamp and location cue, parsed from the received measurement; cue-specific assistance data forwarded to Correlator 121 and to Geometry Engine 122; GPS almanac data used to identify potentially acquirable satellites from the location cue; and PRN code replicas used (in conjunction with the 50 Hz data overlay) to generate perfect references for the potentially acquirable satellites.

The Perfect Reference

To understand the rationale for and operation of LPRG 123, consider the impact of the size of a datagram. Correlator 121, and correlators in general, are better able to detect signals buried in noise when they are able to examine longer (larger) datagrams. Signal processing is compute-intensive, and, as a consequence, the limits on the size of datagrams are generally imposed by limits on available computing resources. Today's thick-client GPS systems are constrained to datagrams of the order of 10 milliseconds. Thin-client implementations, leveraging powerful servers capable of processing datagrams spanning hundreds of milliseconds, open the door to dramatic increases in processing gain, resulting in dramatic reduction in the minimum signal strength required to acquire and track GPS satellites. The goal of the GPSP of FIG. 12 is to realize this potential.

The key to efficient implementation is a perfect reference. In general, a perfect reference is defined as any reconstruction of a transmitted GPS satellite signal, inclusive of the 50 Hz data overlay. In the context of this patent application, the term is used to describe reconstructions which span one or more cycles of the 50 Hz data overlay. The term "large datagram" is likewise used to describe datagrams which span one or more cycles of the 50 Hz data overlay.

A local perfect reference is a specific reconstruction of the transmitted GPS satellite signal as it would present to an observer at a specific time and place (absent interference of any sort).

The construction of a perfect reference for a select satellite is a straightforward process, given the 50 Hz data stream from the satellite and its PRN code replica. The construction of perfect references for the potentially acquirable satellites, and the subsequent localization of these perfect references, is the function of LPRG 123.

The Global GPS Assistance System (GGAS) accessed over the network is, in this case, the system described in FIG. 10(b), owing to the fact that the efficient processing of large datagrams is facilitated by a priori knowledge of the rate of change of the carrier frequency (Doppler shift). The GGAS receives a request for GPS assistance data from LPRG 123, accompanied with cues necessary to enable it to provide LPRG 123 the time and location-specific GPS assistance data critical to the accurate and efficient extraction of surfaces of location from the received GPS data.

Self-Locating Beacons

The methods and systems detailed herein enable (without modification) the introduction of the self-locating beacon. Consider the case in which the beacon and the measuring instrument are collocated (and stationary, of course). In this case, measurements recorded at different times, in the same place, for the same beacon, are used to estimate the location of the beacon. Access points (be they Wi-Fi AP's or Femtocells), outfitted with the thin client of FIG. 11, could locate themselves over a period of hours, and continually refine their self-estimated location in the days following installation.

The Thin-Client Alternative (to Thick-Client GPS)

Figure 13:
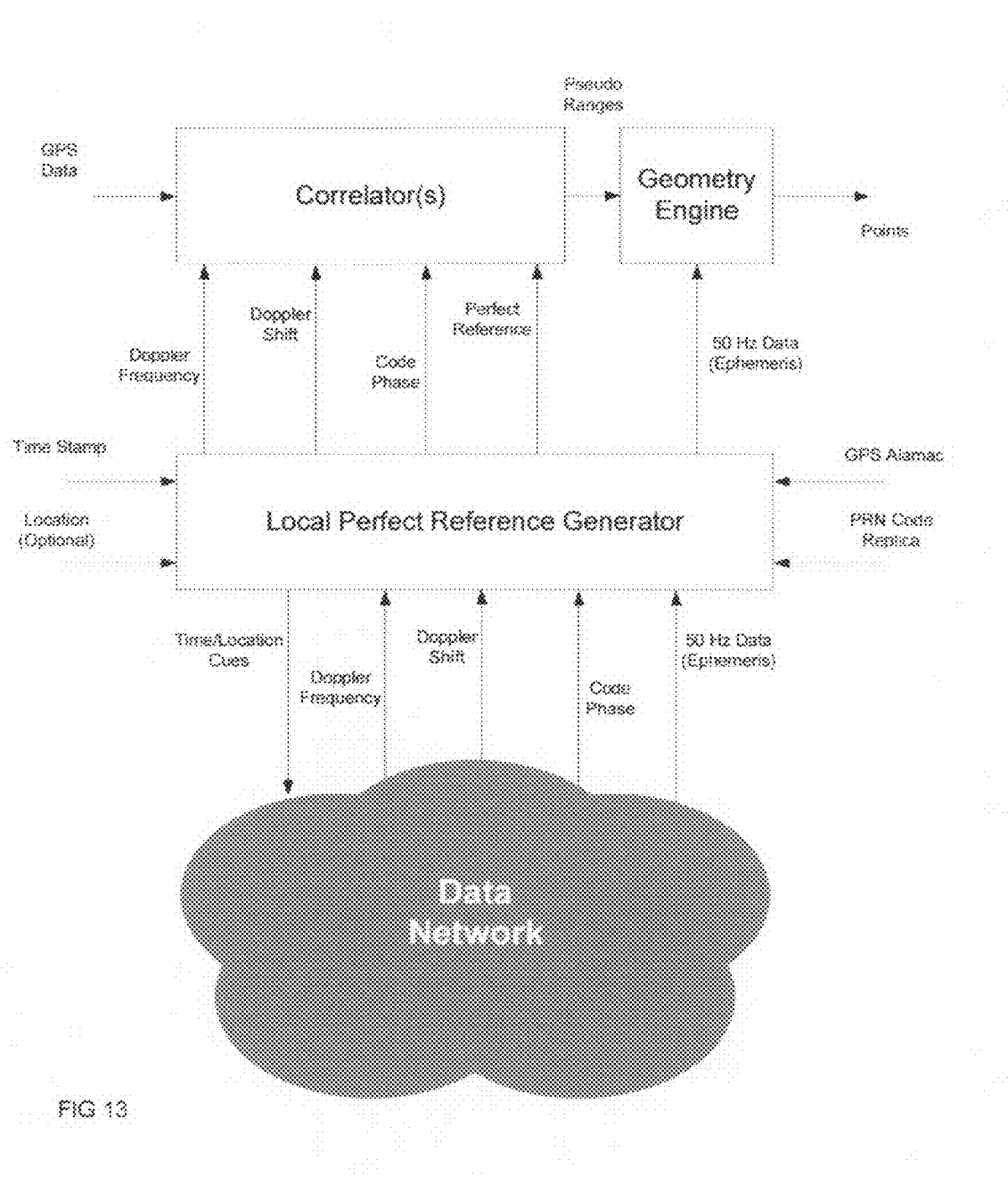
FIG. 13 shows a block diagram of a GPS server used in a thin-client implementation of a GPS signal processing system employing the present invention

While the methods and systems described in the foregoing paragraphs enable the rapid, inexpensive compilation of Beacon Location/Signal-Strength Contour Databases, they equally applicable to the common task of locating a GPS sensor, in a mobile device for example. FIG. 13 describes the server component of a thin-client implementation of a GPS processing system for use in the location of GPS sensors. With the exception that the Geometry Engine of FIG. 13 remains idle until the number of acquirable satellites is sufficient to generate a fix, the GPSP uses a local perfect reference to realize the benefit of large datagrams just as the GPSP described in FIG. 12. To the extent that it presumes a location cue, it presumes, in effect, a cellular network connection. As access-point-based location services assume the burden of locating mobile devices indoors, the impact of this limitation will narrow to Wi-Fi-only mobile devices used outdoors, where short datagrams are sufficient and the lack of a location cue does not present a problem. (Absent a location cue, the GPSP of FIG. 13 would process short datagrams, unassisted, in the manner of tens of millions of GPS-equipped cellphones in use today.)

3D Location-Based Applications

Should the requirements of location-based applications evolve to 3D, the inventions disclosed and taught in this patent application are applicable, with trivial extension, to 3D Mobile Device Location Systems.

We claim:

1. A method for building a database of beacon locations within a geographical area of interest, said method comprising:
   deploying one or more mobile beacon database-building devices throughout said geographical area of interest, each having a GPS receiver and a beacon signal receiver;
   each mobile beacon database-building device periodically measuring and recording a time-stamped composite GPS signal together with the beacon IDs detectable at the point of measurement;
   deriving, from each time stamped composite GPS signal, the start-of-transmission and the time-of-arrival (TOA) from an identified GPS satellite;
   constructing, for each of said identified GPS satellites, a spherical surface of location;
   centered on said GPS satellite's position at the start-of-transmission, with a radius corresponding to the difference between the time-of-arrival (TOA) and the start-of transmission;
   storing said spherical surfaces of location, each with the beacon IDs detectable at the point of measurement, in a beacon survey database;
   estimating beacon locations by determining the points for which the sum of the squares of the distances to each of three or more spherical surfaces of location sharing one of the beacon IDs detectable at the point of measurement is minimized; and
   storing each estimated beacon location, together with the corresponding shared one of the beacon IDs detectable at the point of measurement, in a beacon location database.

2. A method for building a database of beacon locations within a geographical area of interest, said method comprising:
   deploying one or more mobile beacon database-building devices throughout said geographical area of interest, each having a GPS receiver and a beacon signal receiver;
   each mobile beacon database-building device periodically measuring and recording a composite GPS signal together with the beacon IDs detectable at the point of measurement;
   deriving, from each composite GPS signal, the start-of-transmission from each of two identified GPS satellites and the difference in the times of arrival (TDOA);
   constructing, for each pair of identified GPS satellites, a hyperplane of location comprised of points for which the difference between the distances from each point to the positions of each of said pair of identified satellites at the start-of-transmission is fixed by the difference in the times of arrival (TDOA);
   storing said hyperplanes of location, each with the beacon IDs detectable at the point of measurement, in a beacon survey database;
   estimating beacon locations by determining the points for which the sum of the squares of the distances to each of three or more hyperplanes of location sharing one of the beacon IDs detectable at the point of measurement is minimized; and
   storing each estimated beacon location, together with the corresponding shared one of the beacon IDs detectable at the point of measurement, in a beacon location database.

3. A method for building a database of beacon locations within a geographical area of interest, said method comprising:
   deploying one or more mobile beacon database-building devices throughout said geographical area of interest, each mobile beacon database-building device having a GPS receiver and a beacon signal receiver;
   each mobile beacon database-building device periodically measuring and recording a time-stamped composite GPS signal together with the beacon IDs detectable at the point of measurement;
   extracting the canonical set of surfaces of location from each of the time stamped composite GPS signals;
   storing said surfaces of location, each with the beacon IDs detectable at the point of measurement, in a beacon survey database;
   estimating, from surfaces of location sharing one of the beacon IDs detectable at the point of measurement, the location of the beacon corresponding to said shared one of the beacon IDs detectable at the point of measurement; and
   storing each estimated beacon location, together with the corresponding shared one of the beacon IDs detectable at the point of measurement, in a beacon location database.

4. The method of claim 3, wherein the estimated location of the beacon corresponding to said shared one of the beacon IDs detectable at the point of measurement is the estimated location of the one or more mobile beacon database-building devices at such times as said shared one of the beacon IDs detectable at the point of measurement was detected, determined as the point for which the sum of the squares of the distances to each of three or more surfaces of location sharing the one of the beacon IDs detectable at the point of measurement is minimized.

5. The method of claim 3, wherein each measurement contains the strengths of the signals from the beacons corresponding to the beacon IDs detectable at the point of measurement.

6. The method of claim 5, wherein the strength of a signal is recorded as received signal strength indicator (RSSI).

7. The method of claim 6, where the RSSI recorded with a given measurement is used to weight the influence of said measurement, in estimating, from surfaces of location sharing one of the beacon IDs detectable at the point of measurement, the location of said beacon.

8. A system for building a database of beacon locations within a geographical area of interest, said system comprising:
   one or more mobile beacon database-building devices, each having a GPS receiver and a beacon signal receiver;
   a survey process, whereby each of said one or more mobile beacon database-building devices, operating within said geographical area of interest, periodically measures and records a time-stamped composite GPS signal together with beacon signature pairs comprising the IDs and associated signal strengths of beacons detected at the point of measurement;
   GPS signal processing means for extracting the canonical set of surfaces of location from the time stamped composite GPS signals;
   surface of location database means for storing surfaces of location, each with its associated beacon signature pairs;
   beacon location estimation means for estimating, from surfaces of location sharing one of the beacon IDs detectable at the point of measurement, the location of the beacon corresponding to the shared one of the beacon IDs; and beacon location database means for storing the estimated beacon locations, each with its corresponding shared one of the beacon IDs.

9. The system of claim 8, wherein the estimation of beacon location is accomplished by estimating the location of the one or more mobile beacon database-building devices at such times as said beacon was detected, determined as the point for which the sum of the squares of the distances to each of three or more surfaces of location sharing said one of the beacon IDs detectable at the point of measurement is minimized.

10. The system of claim 8, wherein the GPS signal processing means utilizes a perfect reference.

11. The system of claim 8, wherein the time stamped composite GPS signals span multiple cycles of GPS' 50 Hz data overlay.

* * * * *